United States Patent [19]

Higuchi et al.

[11] Patent Number: 4,720,422
[45] Date of Patent: Jan. 19, 1988

[54] MATERIAL FOR COLLECTING RADIONUCLIDES AND HEAVY METALS

[75] Inventors: Hideo Higuchi; Nobuhiro Nonaka, both of Chiba, Japan

[73] Assignee: Japan Chemical Analysis Center, Chiba, Japan

[21] Appl. No.: 719,433

[22] Filed: Apr. 3, 1985

[30] Foreign Application Priority Data

Jun. 6, 1984 [JP] Japan .................. 59-115827
Jun. 15, 1984 [JP] Japan .................. 59-122979

[51] Int. Cl.$^4$ ............... B01D 39/04; B01D 39/16; D06M 11/00
[52] U.S. Cl. ............................ 428/252; 8/510; 8/623; 8/628; 210/502.1; 210/508; 376/313; 423/7; 423/22; 423/25; 423/49; 423/99; 423/138; 423/155; 423/179; 423/658.5; 427/419.1; 427/419.2; 428/263; 428/284; 428/380; 428/389; 428/394
[58] Field of Search ............... 428/252, 263, 284, 380, 428/389, 394; 210/502.1, 508; 8/510, 623, 628; 427/419.1, 419.2; 376/313

[56] References Cited

U.S. PATENT DOCUMENTS 3,965,283 6/1976 Moore ................... 428/389
4,087,583 5/1978 Moore ................... 428/389

Primary Examiner—James C. Cannon
Attorney, Agent, or Firm—Browdy and Neimark

[57] ABSTRACT

A material is, herein disclosed for collecting radionuclides and heavy metals that comprises an acrylic fiber element having $MnO_2$ and/or ferrocyanide compound of the formula $K_2M^{II}[Fe(CN)_6]$ (wherein $M^{II}$ is a divalent metal such as cobalt, zirconium, zinc or nickel) supported thereon. The material of the present invention is used in collecting and concentrating radionuclides present in liquid radioactive wastes discharged from nuclear power plants and other facilities using radioisotopes such as hospitals and non-destructive testing laboratories. The material is also used in collecting and concentrating radionuclides and heavy metals present in the seawater, rivers and industrial waste-water.

15 Claims, 6 Drawing Figures

MATERIAL FOR COLLECTING RADIONUCLIDES AND HEAVY METALS

BACKGROUND OF THE INVENTION

1. Technical Field of the Invention

The present invention relates to a material for collecting radionuclides and heavy metals.

The material of the present invention is used in collecting and concentrating radionuclides present in liquid radioactive wastes discharged from nuclear power plants and other facilities using radioisotopes such as hospitals and non-destructive testing laboratories. The material is also used in collecting and concentrating radionuclides and heavy metals present in the seawater, rivers and industrial wastewaters.

2. Prior Art

The seawater and rivers have been proved to contain trace levels of artifically induced radionuclides such as $^{60}$Co, $^{54}$Mn, $^{90}$Sr, $^{65}$Zn and $^{137}$Cs. Efficient and selective collecting and concentration of such radionuclides is essential for ensuring accurate radioassay and precise detection and determination of nuclides by analytical apparatuses. This requirement is vital if the nuclides to be detected or assayed are those of extremely low levels present in samples taken from the environment. Various sparingly inorganic and organic adsorbents are currently used in collecting and concentrating radionuclides present in extremely low levels in aqueous solutions such as those from the seawater and rivers. The selection of the proper adsorbents depends on the chemical properties of the target nuclide. Attempts are being made to perform a rapid, simple and selective collecting of radionuclides by supporting such adsorbents on specific carriers such as silica gel and particulate resins without attaching them by a strong chemical bond.

Radionuclides are also present in radioactive liquid wastes discharged from nuclear power plants and other facilities using radioisotopes such as hospitals and non-destructive testing laboratories. From a safety aspect, it is necessary to reduce the radioactivity level of such liquid wastes by removal of the radionuclides.

There are two conventional methods for separating and removing radionuclides from radioactive liquid wastes: precipitation by coagulation, and ion-exchanging. In the first method, a coagulant is added to the waste to neutralize the electrical charge on the individual particles of radioactive material, which then agglomerate to form larger particles or "flocs" which settle by gravity to come out of the solution. Commonly employed coagulants are $Al_2(SO_4)_3+Ca(OH)_2$, clay (+polymeric coagulant), $FeCl_3+Na_2S$, and $Na_3PO_4+Ca(OH)_2$.

The first method achieves a not so high decontamination factor but is extensively used in treating a large volume of liquid waste having a simple composition. On the other hand the ion-exchange method is very good in respect of the decomposition and permits the use of many types of exchangers such as synthetic cation-exchangers, anion-exchangers, mixedbed ion-exchangers, natural organic exchangers such as those based on coal, brown coal and peat, as well as inorganic exchangers such as those based on greensand, kaolinite and zeolite. According to these methods, the radioactive substance is eventually concentrated in either the sludge (the precipitation method) or regenerated liquid wastes (the ion-exchange method). In the treatment of short lived radioactive liquid wastes, the concentrated liquid may be discarded after storage for a certain period so long as purified water has become available. However, in the treatment of long lived radioactive liquid wastes, a secondary treatment is necessary for immobilizing the concentrated radioactive substance so as to avoid subsequent diffusion. After the sludge or regenerated liquid waste is dewatered and its volume is reduced by the secondary treatment, it is converted into a solid form. The volume reduction rates achieved are <1, 4, 5–10, 10–15, 25–35 and 2–4 respectively by secondary treatment such as precipitation, filtration with such as sand, filtration under pressure, vacuum filtration, centrifuging and autoclaving. The ideal material for collecting radionuclides present in radioactive liquid wastes should satisfy, among other thing, the requirements for rapidity and high efficiency. Furthermore, the material that has collected nuclides should desirably be disposed of by incineration. However, no conventional collecting materials satisfy all of these requirements.

While developing a material for collecting radionuclides present in radioactive liquid wastes discharged from nuclear power plants and other facilities using radioisotopes, the present inventors looked to the concept involved in collecting radionuclides present in extremely low levels in the seawater and rivers. Materials suitable for collecting radionuclides present in extremely low levels in the seawater and rivers require a high degree of simplicity in handling, rapidity and selectivity. For this purpose, materials such as ion-exchange resins that rely on equilibria between adsorption and desorption are not suitable; more preferred are inorganic adsorbents that are carried on suitable supports and which adsorb extremely low levels of nuclides by coprecipitation, surface adhesion or internal adsorption. The present inventors applied this idea to the development of a material for collecting radionuclides present in radioactive liquid wastes discharged from nuclear power plants and other facilities using radioisotopes. The material developed by the present inventors comprises an inorganic adsorbent carried on a support that can be disposed of by incineration. By using this material, not only nuclides that are present in extremely low levels in the seawater and rivers but also those nuclides which are present in radioactive liquid wastes discharged from nuclear power plants and other facilities using radioisotopes can be collected readily, rapidly and selectively. If necessary, the material that has collected such nuclides may be disposed of by incineration. Therefore, the present invention provides the ideal material for collecting not only nuclides present in extremely low levels in the seawater and rivers but also those which are present in radioactive liquid wastes liquors.

An incidental advantage of the collecting material according to the present invention is that it may be used as a means for concentration that is performed as a preliminary treatment for analyzing trace heavy metal elements, particularly those which are harmful and may cause pollution, or for recovery of precious metals.

The collecting material according to the present invention comprises an acrylic fiber element which fixedly supports a ferrocyanide compound of the formula $K_2M^{II}[FeCo(CN)_6]$ (wherein $M^{II}$ represents a divalent metal such as cobalt, zinc, zirconium or nickel) and/or manganese dioxide ($MnO_2$). This material has been proved to have the capability of collecting various nuclides such as $^{54}Mn$, $^{65}Zn$, $^{144}Ce$, $^{137}Cs$, $^{59}Fe$ and $^{60}Co$ in an efficiency almost equal to 100%.

In this specification, the collective term "radionuclides" will be used to denote not only radionuclides present in extremely low levels in the seawater and rivers but also those radionuclides which are present in radioactive liquid wastes produced in nuclear power plants and other facilities using radioisotopes.

In the prior art, the attachment of adsorbents to carriers has been described by various expressions depending upon the nature and properties of the adsorbents and carriers, as well as upon subtle differences with respect to the method of attachment; among the expressions conventionally used are load, coat, impregnate, contain, bind, incorporate, composite, mix, treat, couple, retain, combine, support, immobilize and modify. It should be understood that the term "support" as used therein covers and is synonymous with all of these expressions.

SUMMARY OF THE INVENTION

One object of the present invention is to provide a material for collecting radionuclides and heavy metals that comprises an acrylic fiber element having $MnO_2$ supported thereon (this type of collector will hereunder sometimes be referred to by appending the suffix $MnO_2$).

Another object of the present invention is to provide a material for collecting radionuclides and heavy metals that comprises an acrylic fiber element having supported thereon a ferrocyanide compound of the formula $K_2M^{II}[Fe(CN)_6]$ wherein $M^{II}$ is a divalent metal such as cobalt, zinc, zirconium or nickel). (This type of collector will hereunder sometimes be referred to by appending the suffix KCFC.

A further object of the present invention is to provide a material for collecting radionuclides and heavy metals that comprises an acrylic fiber element having supported thereon both $MnO_2$ and a ferrocyanide compound of the formula $K_2M^{II}[Fe(CN)_6]$ ($M^{II}$ is the same as defined above). (This type of collector will hereunder sometimes referred to by appending the suffix $MnO_2$+KCFC.

Still another object of the present invention is to provide a material for collecting radionuclides and heavy metals that consists of the combination of a collector-$MnO_2$ and a collector KCFC.

DETAILED DESCRIPTION OF THE INVENTION

One embodiment for preparing each type of the collecting material of the present invention is shown below.

Collector-KCFC

An acrylic fiber (100 g) is immersed in a 10% aqueous solution of potassium ferrocyanide and heated for 3 hours. The fiber is then recovered from the solution and transferred into a 10% aqueous solution of $M^{II}(NO_3)_2$. After heating for 3 hours, the fiber is recovered from the solution, washed with water and dried at 60°-70° C. for 10 hours. The same procedure is repeated two more times to obtain a red brown collector having $K_2M^{II}[Fe(CN)_6]$ fixedly supported on the acrylic fiber.

Collector-$MnO_2$

An acrylic fiber (100 g) is immersed in an aqueous solution of 0.5 M potassium permanganate for 4 days. When the fiber turns black, it is recovered from the solution and excess potassium permanganate is washed off with pure water. The fiber is dried at 60°-70° C. to obtain a black collector having $MnO_2$ fixedly supported on the acrylic fiber.

Collector-KCFC+$MnO_2$

An acrylic fiber (100 g) is immersed in a 10% aqueous solution of potassium ferrocyanide and heated for 3 hours. The fiber is then recovered from the solution and transferred into a 10% aqueous solution of $M^{II}(NO_3)_2$. After heating for 3 hours, the fiber is recovered from the solution, washed with water and dried at 60°-70° C. for 10 hours. The same procedure is repeated two more times. Thereafter, the fiber is immersed in an aqueous solution of 0.5 M potassium permanganate for 4 days. When the fiber turns black, it is recovered from the solution and excess potassium permanganate is washed off with pure water. The fiber is then dried at 60°-70° C. to obtain a capturing material having both $K_2M^{II}[Fe(CN)_6]$ and $MnO_2$ fixedly supported on the acrylic fiber.

Another method for preparing a collector-KCFC+$MnO_2$ proceeds as follows. An acrylic fiber (100 g) is immersed in a 10% aqueous solution of $M^{II}(NO_3)_2$ and heated for 3 hours. The fiber is transferred into a 10% aqueous solution of potassium ferrocyanide and heated for 3 hours. The fiber is recovered from the solution, washed with water and dried at 60°-70° C. for 10 hours. The same procedure is repeated two more times. The obtained fiber is immersed in an aqueous solution of 0.5 M potassium permanganate and subsequently treated as in the first method.

The collector-KCFC according to the present invention is capable of collecting $^{134+137}Cs$, $^{59}Fe$, $^{65}Zn$ and $^{144}Ce$ in efficiencies substantially equal to 100%. However, this type of collector is not highly effective with $^{54}Mn$.

On the other hand, the collector-$MnO_2$ has the ability to collect not only $^{54}Mn$ but also $^{65}Zn$ and $^{144}Ce$ in efficiencies almost equal to 100%. Therefore, by using a column filled with a mixture of the two types of collector or by coupling two columns, one filled with the collector-KCFC and the other filled with the collector-$MnO_2$, $^{54}Mn$, $^{59}Fe$, $^{60}Co$, $^{65}Zn$, $^{134+137}Cs$ and $^{144}Ce$ can be collected in a 100% efficiency. The same efficiency can be achieved by using a collector-KCFC+$MnO_2$ which has both $K_2M^{II}[Fe(CN)_6]$ and $MnO_2$ fixedly supported on an acrylic fiber.

The acrylic fiber element used in the present invention consists of filaments of a size of 18 μm that have been prepared by copolymerizing vinyl chloride with 8 wt % methyl acrylate. The acrylic fiber contains 0.05 meq of $SO_3^-$ per gram of the fiber as an anionic group. This fiber is highly resistant against not more than 30% hydrochloric acid, nitric acid or sulfuric acid. However, the alkali resistance of this fiber is very low and it is denatured by aqueous sodium hydroxide whose concentration is as low as 1%. The acrylic fiber element used in the present invention may be shaped into any desired form such as a woven or nonwoven cloth before $MnO_2$ or $K_2M^{II}[Fe(CN)_6]$ is supported thereon. Alternatively, $MnO_2$ or $K_2M^{II}[Fe(CN)_6]$ may be first supported on a fluffy acrylic fiber element, and the resulting collecting material is shaped into a desired form such as a woven or nonwoven cloth.

The suitable pH range for good performance as adsorbent of the present invention is from 7 to 9, and within this range does the material exhibit a near 100% efficiency for collecting $^{54}Mn$, $^{65}Zn$, $^{59}Fe$, $^{60}Co$, $^{103+106}Ru$, $^{137}Cs$ and $^{144}Ce$. More importantly, this effect of the present invention can be achieved even in the presence of large quantities of $Na^+$ ions.

It is preferred that a suitable type of the collecting material of the present invention be used in depending upon the nature of radioactive liquid wastes to be treated. For example, in order to remove radionuclides present in the primary cooling water discharged from a light-water reactor, a material having both $K_2Ni[Fe(CN)_6]$ and $MnO_2$ fixedly supported on an acrylic fiber element is preferably used instead of a material having $K_2Co[Fe(CN)_6]$ fixedly supported on the acrylic fiber element.

The advantages of the present invention are hereunder described in greater detail by reference to working examples and a reference example.

The supporting material and adsorbents used in preparing collecting materials in the working examples are identified below.

(a) Acrylic fiber: Consisting of filaments of a size of 18 μm that were prepared by copolymerizing vinyl chloride with 8 wt % methyl acrylate. This fiber contained 0.05 meq of $SO_3^-$ per gram of the fiber as an anionic group.

(b) Potassium ferrocyanide: guaranteed reagent
(c) Cobalt nitrate: guaranteed reagent
(d) Potassium Permanganate: Guaranteed Reagent.

EXAMPLE 1

Collector-$MnO_2$:

The acrylic fiber (100 g) was immersed in an aqueous solution of 0.5 M potassium permanganate for 4 days. When the fiber turned black, it was recovered from the solution, washed with pure water and dried at 60°–70° C. to obtain a black fluffy collector-$MnO_2$.

EXAMPLE 2

Collector-KCFC:

The acrylic fiber (100 g) was immersed in a 10% aqueous solution of potassium ferrocyanide and heated for 3 hours. Thereafter, the fiber was recovered, transferred into a 10% aqueous solution of cobalt nitrate, and heated for 3 hours. The fiber was then recovered, washed with water and dried at 60°–70° C. for 10 hours. The same procedure was repeated two more times to obtain a reddish brown fluffy collector-KCFC having $K_2Co[Fe(CN)_6]$ fixedly supported on the acrylic fiber.

EXAMPLE 3

Collector-KCFC+$MnO_2$:

The acrylic fiber (100 g) was immersed in a 10% aqueous solution of potassium ferrocyanide and heated for 3 hours. The fiber was recovered from the solution and transferred into a 10% aqueous solution of cobalt nitrate. After heating for 3 hours, the fiber was recovered from the solution, washed with water and dried at 60°–70° C. for 10 hours. The same procedure was repeated two more times. Then, the fiber was immersed in an aqueous solution of 0.5 M potassium permagnate for 4 days. When the fiber turned black, it was recovered from the solution, and excess potassium permanganate was washed off with pure water. By drying the washed fiber at 60°–70° C., a black fluffy collector-KCFC+$MnO_2$ was obtained.

The three types of collector prepared in Examples 1 to 3 were checked for their ability to collect radionuclides present in the seawater. The results are shown below.

REFERENCE EXAMPLE

1. Apparatus and sample preparation
A. Column

A glass column having an inside diameter of 15 mm and a length of 20 cm was used.
B. Seawater Seawater samples taken in Katsuura, Chiba, Japan were filtered through a microporous filter (pore size: 0.45 μm) manufactured by Fuji Photo Film Co., Ltd. The radionuclides shown below were added to each sample as tracers. Thereafter, each sample was treated with solutions of hydrochloric acid and sodium hydroxide so as to adjust its pH to 8.0±0.5. Each seawater sample contained 33.7% of NaCl.

C. Tracer nuclides
$^{54}Mn$ ($MnCl_2$, 0.5NHCl): carrier-free
$^{59}Fe$ ($FeCl_3$, 0.5NHCl): 11 mCi/mgFe
$^{60}Co$ ($CoCl_2$, 0.1NHCl): 136 mCi/mgCo
$^{65}Zn$ ($ZnCl_2$, 0.5NHCl): 2.8 mCi/mgZn
$^{85}Sr$ ($SrCl_2$, 0.5NHCl): 7.4 mCi/mgSr
$^{106}Ru$ (Chloride, 4NHCl): 7.7 mCi/mgRu
$^{137}Cs$ (CsCl, 0.5NHCl): 9.0 mCi/mgCs
$^{144}Ce$ ($CeCl_3$, 1NHCl): 250 mCi/mgCe These nuclides as diluted to ca. 100 nCi/ml were added to the seawater samples.

D. NaI(Tl) Schintillation spectrometer:

The equipment was composed of a well-type NaI(Tl) detector (44 mmφ×51 mm) connected to a universal scaler Model TDC-501 of Aloka Co., Ltd.

2. Method
2.1 Batch method

The tracers listed in 1.C. were added to 220-ml samples of three batches of the seawater. The collector prepared in Examples 1 to 3 were added to the samples and mixed under agitation for four different times, i.e., 2 minutes, 5 minutes, 10 minutes and 20 minutes. After agitation for the predetermined period, a given amount of each seawater sample was transferred into a polyethylene tube and the percent efficiency for collecting of each tracer nuclide was determined by the NaI(Tl) detector. The experimental conditions used in this batch method are shown in Table 1. The collecting efficiency A is given by the following formula:

$$A(\%) = \{(R_1 - R_2)/R_1\} \times 100$$

wherein
$R_1$: counting rate of the seawater containing tracers
$R_2$ counting rate of the seawater after agitation.

TABLE 1

Experimental conditions for the batch method

| Nuclides | Amount of collector (g) | Amount of RI added (ml) | Initial pH | Ending pH | Amount measured (ml) | Remarks |
|---|---|---|---|---|---|---|
| $^{54}$Mn | 1.0 | 2.0 | 7.96 | 7.85 | 1.0 | |
| $^{59}$Fe | 1.0 | 3.0 | 8.18 | 7.99 | 2.0 | |
| $^{60}$Co | 1.0 | 0.25 | 8.12 | 8.03 | 1.0 | |
| $^{65}$Zn | 1.0 | 1.0 | 8.13 | 7.97 | 1.0 | |
| $^{85}$Sr | 1.0 | 0.50 | 8.49 | 8.46 | 1.0 | |
| $^{106}$Ru | 1.0 | 0.50 | 8.33 | 8.20 | 1.0 | $HNO_3$ form |
| $^{137}$Cs | 1.0 | 1.0 | 8.15 | 8.03 | 1.0 | |
| $^{144}$Ce | 1.0 | 0.50 | 8.08 | 8.08 | 1.0 | |

2.2 Column method

Glass columns (ID=15 mm) were filled with the collector prepared in Examples 1 to 3. Seawater samples (200 ml containing tracers were passed through the columns at varying flow rates. A given amount of each effluent was transferred into a polyethylene tube and the percent efficiency of capturing of each tracer nuclide was determined by the NaI(Tl) detector. The experimental conditions used in this column method are shown in Table 2. The collecting efficiency A is given by the following formula:

$$A(\%) = \{(R_1 - R_3)/R_1\} \times 100$$

wherein
$R_1$: counting rate of the seawater containing tracers
$R_3$: counting rate of the column effluent.

TABLE 2

Experimental conditions for the column method

| Nuclides | Amount of collector (g) | Height of collector (mm) | Amount of RI added (ml) | Initial pH | pH of the effluent | Flow rate (ml/min.) | Amount measured (ml) | Remarks |
|---|---|---|---|---|---|---|---|---|
| $^{54}$Mn | 1.0 | 80 | 2.0 | 8.04 | 7.96 | 24 | 1.0 | |
| $^{54}$Mn | 1.0 | 80 | 3.0 | 7.83 | 7.55 | 179 | 1.0 | |
| $^{59}$Fe | 1.0 | 80 | 0.50 | 8.40 | 8.30 | 13 | 1.0 | |
| $^{59}$Fe | 1.0 | 80 | 0.50 | 8.01 | 7.93 | 179 | 1.0 | |
| $^{60}$Co | 1.0 | 80 | 0.25 | 8.00 | 7.86 | 12 | 1.0 | |
| $^{60}$Co | 1.0 | 80 | 0.25 | 8.06 | 7.93 | 156 | 1.0 | |
| $^{65}$Zn | 1.0 | 80 | 1.0 | 8.02 | 7.87 | 18 | 1.0 | |
| $^{65}$Zn | 1.0 | 80 | 1.0 | 8.07 | 7.92 | 179 | 1.0 | |
| $^{106}$Ru | 1.0 | 80 | 0.50 | 8.11 | 7.97 | 21 | 1.0 | HCl form |
| $^{106}$Ru | 1.0 | 80 | 0.50 | 7.84 | 7.65 | 179 | 1.0 | HCl form |
| $^{137}$Cs | 1.0 | 80 | 1.0 | 8.15 | 7.97 | 21 | 1.0 | |
| $^{137}$Cs | 1.0 | 80 | 1.0 | 8.15 | 8.00 | 171 | 1.0 | |
| $^{144}$Ce | 1.0 | 70 | 0.50 | 8.13 | 8.08 | 6.9 | 1.0 | |
| $^{144}$Ce | 1.0 | 70 | 0.50 | 8.06 | 8.03 | 190 | 1.0 | |

Figure 1:
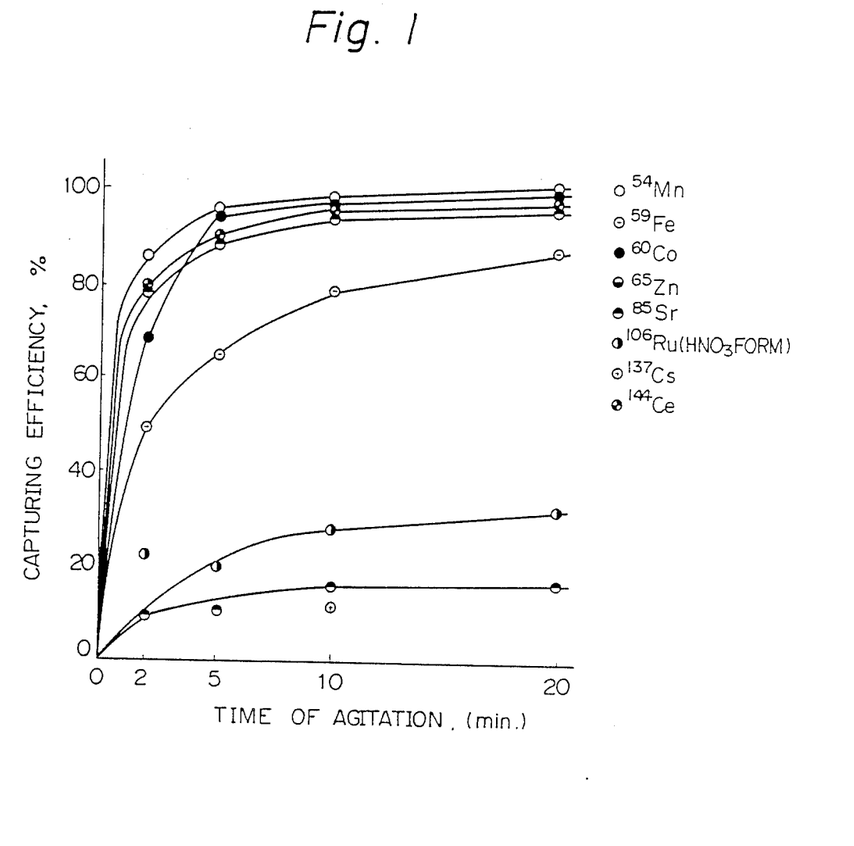
FIG. 1 is a graph showing the relationship between agitation time and the collecting efficiency of $MnO_2$.
Figure 2:
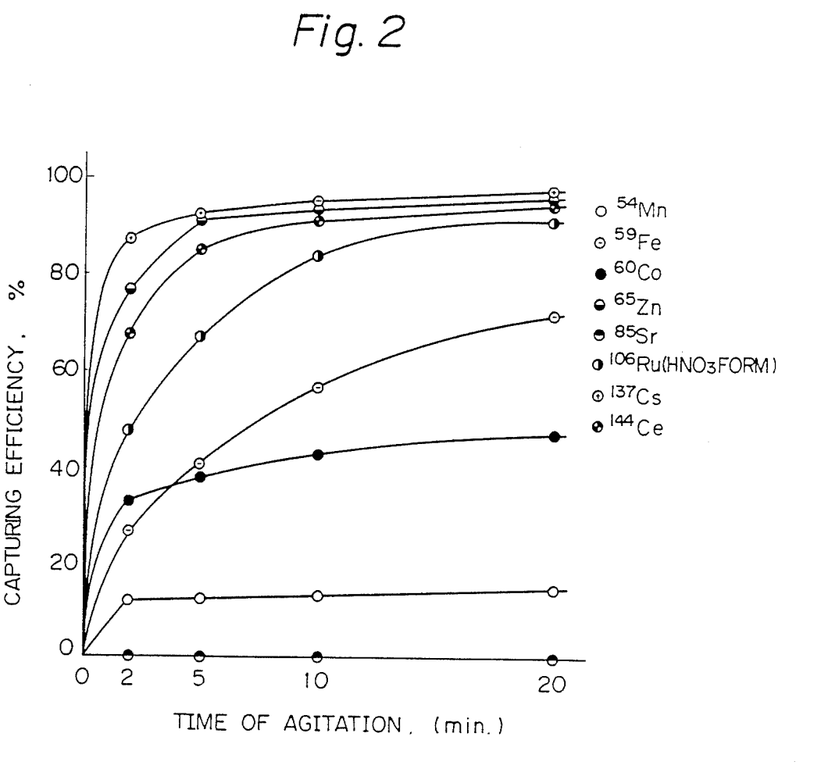
FIG. 2 is a graph showing the relationship between agitation time and the collecting efficiency of collector-KCFC.
Figure 3:
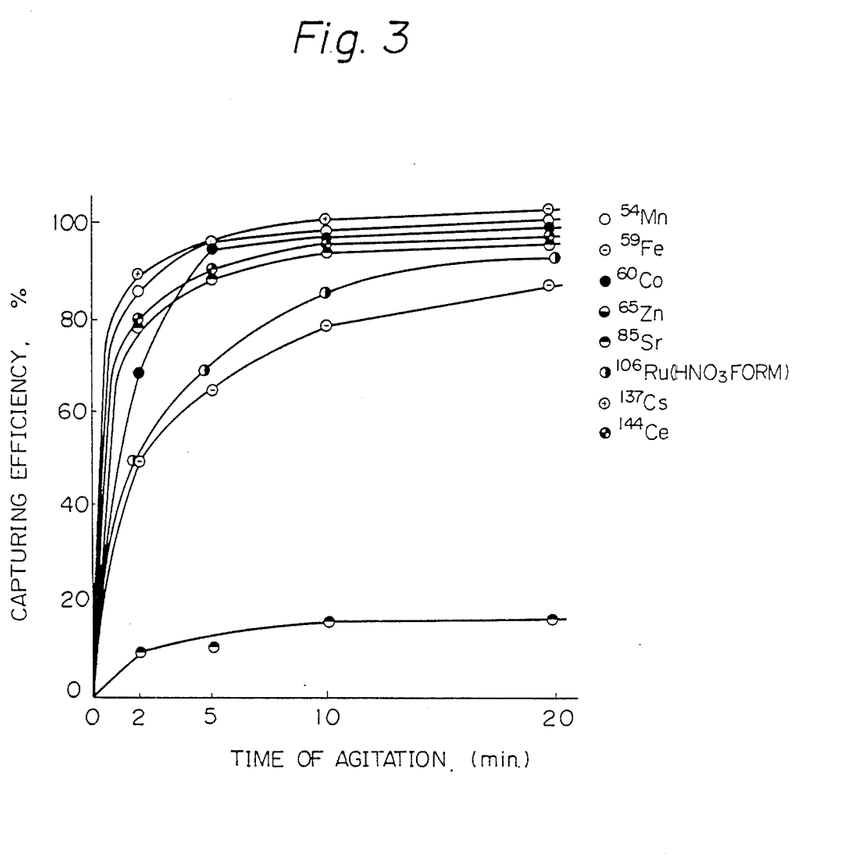
FIG. 3 is a graph showing the relationship between agitation time and the collecting efficiency of collector-KCFC+$MnO_2$.

3. Results and discussion 3.1 Agitation time vs. collecting efficiency in the batch method The test results for the batch method are depicted in FIGS. 1 to 3. As one can see from FIG. 1, the collector-$MnO_2$ was capable of collecting almost all of $^{54}$Mn, $^{60}$Co and $^{144}$Ce by 20-minute agitation. FIG. 2 shows that the collector-KCFC achieved a more than 90% efficiency in collecting $^{65}$Zn, $^{106}$Ru and $^{144}$Ce after 20-minute agitation, whereas the collecting efficiency of $^{54}$Mn, $^{60}$Co and $^{59}$Fe was relatively low. FIG. 2 also shows that the collector-KCFC was entirely ineffective for collecting $^{85}$Sr.

It would be very interesting to note that $^{106}$Ru which could not be effectively collected by the collector-$MnO_2$ showed the efficiency of 91% with the collector-KCFC. FIG. 3 shows that the collector-KCFC+$MnO_2$ was capable of collecting $^{54}$Mn, $^{59}$Fe, $^{60}$Co, $^{65}$Zn, $^{137}$Cs and $^{144}$Ce in efficiencies almost equal 100%.

3.2 Flow rate vs. collecting efficiency in the column method

Figure 4:
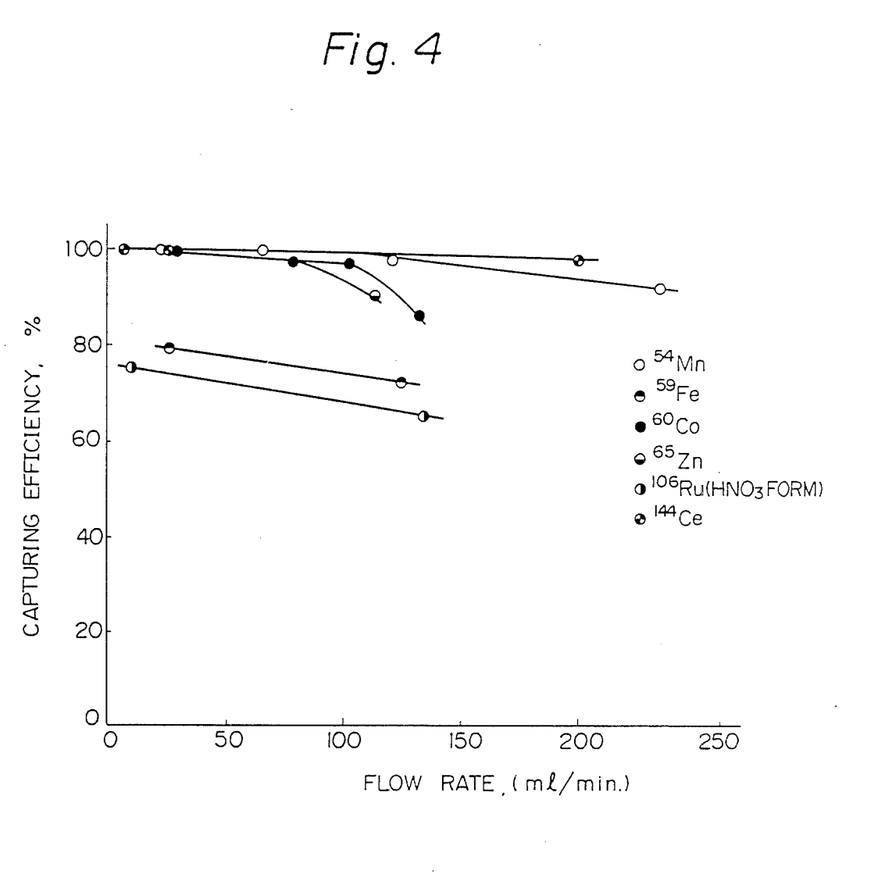
FIG. 4 is a graph showing the relationship between flow rate and the collecting efficiency of collector-$MnO_2$.
Figure 5:
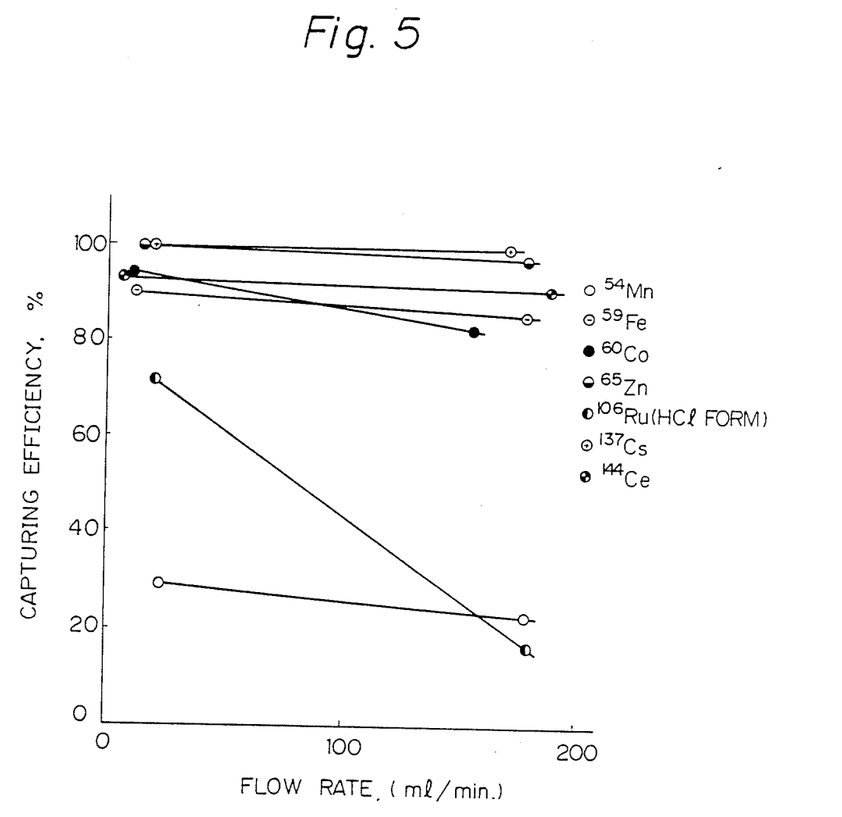
FIG. 5 is a graph showing the relationship between flow rate and the collecting efficiency of collector-KCFC.
Figure 6:
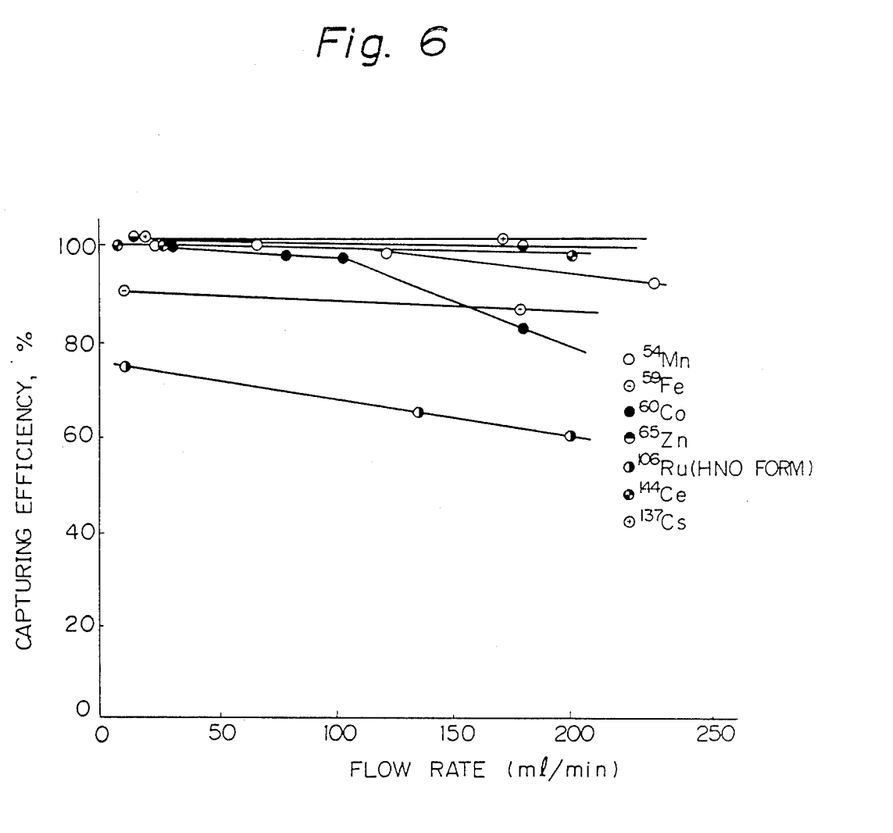
FIG. 6 is a graph showing the relationship between flow rate and the collecting efficiency of collector-KCFC+$MnO_2$.

The test results for the column method are depicted in FIGS. 4 to 6. As one can see from FIG. 4, the collecting-$MnO_2$ achieved more than 90% efficiencies of $^{144}$Ce, $^{54}$Mn, $^{60}$Co and $^{65}$Zn at a flow rate of 20 ml/min. The collecting efficiency for $^{144}$Ce and $^{54}$Mn was still more than 90% at flow rates of 200 ml/min and higher. As FIG. 5 shows, the collector-KCFC achieved more than 90% efficiencies of collecting $^{59}$Fe, $^{60}$Co, $^{65}$Zn, $^{137}$Cs and $^{144}$Ce at a flow rate of 20 ml/min. The collecting efficiency for these nuclides was still more than 80% at a flow rate of 180 ml/min. The collecting efficiency for $^{65}$Zn, $^{137}$Cs and $^{144}$Ce did not vary between the flow rates of 20 ml/min and 180 ml/min. However the collecting efficiencies for $^{59}$Fe and $^{60}$Co decreased at 180 ml/min by 5% and 10%, respectively. The collecting efficiency for $^{106}$Ru at 180 ml/min was 55% smaller than the value at 20 ml/min. FIG. 6 shows the results for the collector-KCFC+$MnO_2$; the efficiency of collecting $^{54}$Mn, $^{137}$Cs, $^{144}$Ce, $^{60}$Co, $^{65}$Zn and $^{59}$Fe was held at least about 90% in the flow rate range of 180–200 ml/min.

The above results show that by using the collector-$MnO_2$ in combination with the collector-KCFC or by using the collector-KCFC+$MnO_2$, various radionuclides such as $^{54}$Mn, $^{59}$Fe, $^{60}$Co, $^{65}$Zn, $^{103+106}$Ru, $^{137+134}$Cs and $^{144}$Ce can be collected in efficiencies of approximately 100% even in the presence of large quantities of $Na^+$ ion.

As will be apparent by reading the foregoing description, the collecting material of the present invention has the following advantages:

(1) it is capable of collecting $^{54}$Mn, $^{59}$Fe, $^{60}$Co, $^{65}$Zn, $^{103+106}$Ru, $^{134+137}$Cs and $^{144}$Ce in the pH range of 7-9;

(2) it is capable of collecting these nuclides even in the presence of large quantities of $Na^+$ ion;

(3) it can be woven or knitted into a desired form, and therefore, by processing it into a nonwoven cloth having a desired thickness, a product suitable for use as a filter or an element to prevent the leakage of radioactive waste liquors can be prepared;

(4) since it is inflammable, the collecting material of the present invention can be easily disposed of by simple incineration.

What is claimed is:

1. A material for collecting radionuclides and heavy metals which comprises an acrylic fiber element having fixedly supported thereon at least one ferrocyanide compound of the formula $K_2M^{II}[Fe(CN)_6]$ wherein $M^{II}$ is a divalent metal selected from the group consisting of Co, Zn, Zr and Ni.

2. The material in accordance with claim 1 wherein $M^{II}$ is Co.

3. The material in accordance with claim 1, wherein $M^{II}$ is Zn.

4. The material in accordance with claim 1, wherein $M^{II}$ is Zr.

5. The material in accordance with claim 1, wherein $M^{II}$ is Ni.

6. A material for collecting radionuclides and heavy metals which consists of the combination of a collecting material comprising an acrylic fiber element having $MnO_2$ fixedly supported thereon and a collecting material comprising an acrylic fiber element having fixedly supported thereon a ferrocyanide compound of the formula $K_2M^{II}[Fe(CN)_6]$ wherein $M^{II}$ is a divalent metal selected from the group consisting of Co, Zn, Zr and Ni.

7. The material in accordance with claim 6 wherein $M^{II}$ is Co.

8. The material in accordance with claim 6 wherein $M^{II}$ is Zn.

9. The material in accordance with claim 6 wherein $M^{II}$ is Zr.

10. The material in accordance with claim 6 wherein $M^{II}$ is Ni.

11. A material for collecting radionuclides and heavy metals which comprises an acrylic fiber element having fixedly supported thereon $MnO_2$ and a ferrocyanide compound of the formula $K_2M^{II}[Fe(CN)_6]$ wherein $M^{II}$ is a divalent metal selected from the group consisting of Co, Zn, Zr and Ni.

12. The material in accordance with claim 11 wherein $M^{II}$ is Co.

13. The material in accordance with claim 11 wherein $M^{II}$ is Zn.

14. The material in accordance with claim 11 wherein $M^{II}$ is Zr.

15. The material in accordance with claim 11 wherein $M^{II}$ is Ni.

* * * * *